United States Patent
Manzella et al.

(10) Patent No.: US 9,334,927 B2
(45) Date of Patent: May 10, 2016

(54) DRIVE SYSTEM FOR CENTRIFUGE WITH PLANETARY GEAR AND FLEXIBLE SHAFT

(75) Inventors: Salvatore Manzella, Barrington, IL (US); Gregory G. Pieper, Waukegan, IL (US); Natalie R. Osterweil, Evanston, IL (US)

(73) Assignee: Fenwal, Inc., Lake Zurich, IL (US)

( * ) Notice: Subject to any disclaimer, the term of this patent is extended or adjusted under 35 U.S.C. 154(b) by 426 days.

(21) Appl. No.: 14/113,425

(22) PCT Filed: Aug. 27, 2012

(86) PCT No.: PCT/US2012/052472
§ 371 (c)(1),
(2), (4) Date: Oct. 23, 2013

(87) PCT Pub. No.: WO2013/043316
PCT Pub. Date: Mar. 28, 2013

(65) Prior Publication Data
US 2014/0038760 A1    Feb. 6, 2014

Related U.S. Application Data

(60) Provisional application No. 61/537,701, filed on Sep. 22, 2011.

(51) Int. Cl.
*B04B 9/08*  (2006.01)
*F16H 1/28*  (2006.01)
(Continued)

(52) U.S. Cl.
CPC ................ *F16H 1/28* (2013.01); *B04B 5/0442* (2013.01); *B04B 9/08* (2013.01); *F16H 7/02* (2013.01); *B04B 2005/0492* (2013.01); *F16H 7/023* (2013.01)

(58) Field of Classification Search
CPC .. B04B 9/08; B04B 2009/085; B04B 5/0442; B04B 2005/0492; F16H 1/28; F16H 7/02; F16H 7/023
USPC ........... 494/17, 18, 21, 45, 83, 84; 210/380.1, 210/380.3, 781, 782; 138/111
See application file for complete search history.

(56) References Cited

U.S. PATENT DOCUMENTS 3,586,413 A * 6/1971 Adams .................. B04B 5/0442
                                                359/212.2
3,986,442 A * 10/1976 Khoja .................... B04B 5/0442
                                                474/150
(Continued)

FOREIGN PATENT DOCUMENTS

EP           0642834 A2 * 3/1995  ............ B04B 5/0442
WO     WO 8801907 A1 * 3/1988  ............ B04B 5/0442

OTHER PUBLICATIONS

International Preliminary Examination Report for International Application No. PCT/US2012/052472, dated Nov. 14, 2013.
(Continued)

*Primary Examiner* — Charles Cooley
(74) *Attorney, Agent, or Firm* — Cook Alex Ltd

(57) ABSTRACT

A drive assembly for a centrifugal processing system is provided for rotating the yoke assembly (36) about a first axis at a first angular velocity and rotating the chamber assembly (30) coaxially with the yoke assembly at a second angular velocity A drive motor (54) is provided for rotating the yoke assembly at the first angular velocity and simultaneously rotating the chamber assembly at the second angular velocity by a sun gear (66) mounted to the chamber assembly for rotation about the first axis and a planetary gear (64) mounted to the yoke assembly that is operatively connected to the sun gear such as to impart rotation to the sun gear as it orbits thereabout upon rotation of the yoke assembly.

7 Claims, 4 Drawing Sheets

(51) Int. Cl.
*F16H 7/02* (2006.01)
*B04B 5/04* (2006.01)

(56) References Cited

U.S. PATENT DOCUMENTS

| | | | | | |
|---|---|---|---|---|---|
| 4,018,304 | A * | 4/1977 | Lolachi | B04B 5/0442 | 184/6 |
| 4,108,353 | A * | 8/1978 | Brown | B04B 9/08 | 494/18 |
| 4,109,852 | A * | 8/1978 | Brown | B04B 5/0442 | 494/18 |
| 4,109,854 | A * | 8/1978 | Brown | B04B 5/0442 | 494/18 |
| 4,109,855 | A * | 8/1978 | Brown | B04B 9/08 | 494/18 |
| 4,113,173 | A * | 9/1978 | Lolachi | A61M 1/3693 | 494/18 |
| 4,120,449 | A * | 10/1978 | Brown | B04B 5/00 | 494/18 |
| 4,163,519 | A * | 8/1979 | Stabile | B04B 5/0442 | 494/18 |
| 4,164,318 | A * | 8/1979 | Boggs | B04B 5/0442 | 494/18 |
| 4,221,322 | A * | 9/1980 | Drago | B04B 5/0442 | 494/18 |
| 4,425,112 | A * | 1/1984 | Ito | B04B 5/00 | 494/18 |
| 4,540,397 | A * | 9/1985 | Lolachi | B04B 9/08 | 494/18 |
| 4,710,161 | A * | 12/1987 | Takabayashi | B04B 5/0442 | 494/10 |
| 4,778,444 | A * | 10/1988 | Westberg | B04B 5/0442 | 494/18 |
| 4,936,820 | A * | 6/1990 | Dennehey | B04B 5/0442 | 494/1 |
| 4,950,401 | A * | 8/1990 | Unger | B04B 5/0442 | 210/360.1 |
| 5,350,514 | A * | 9/1994 | Witthaus | B04B 5/0442 | 210/360.1 |
| 5,525,218 | A * | 6/1996 | Williamson, IV | B04B 5/0442 | 210/232 |
| 5,547,453 | A * | 8/1996 | Di Perna | B04B 7/02 | 494/45 |
| 5,551,942 | A * | 9/1996 | Brown | B04B 5/0442 | 494/18 |
| 5,558,769 | A * | 9/1996 | Witthaus | B04B 9/08 | 210/360.1 |
| 5,665,048 | A | 9/1997 | Jorgensen | | |
| 5,958,250 | A * | 9/1999 | Brown | A61M 1/3693 | 210/745 |
| 5,961,842 | A * | 10/1999 | Min | A61M 1/3693 | 210/110 |
| 5,980,757 | A * | 11/1999 | Brown | B04B 5/0442 | 210/745 |
| 6,027,441 | A * | 2/2000 | Cantu | A61M 1/3693 | 210/143 |
| 6,027,657 | A * | 2/2000 | Min | A61M 1/3693 | 210/143 |
| 6,168,561 | B1 * | 1/2001 | Cantu | A61M 1/3693 | 210/143 |
| 6,312,607 | B1 * | 11/2001 | Brown | A61M 1/3693 | 210/745 |
| 6,582,349 | B1 * | 6/2003 | Cantu | A61M 1/3693 | 210/109 |
| 6,709,377 | B1 * | 3/2004 | Rochat | B04B 5/0442 | 494/10 |
| 9,101,944 | B2 * | 8/2015 | Manzella | B04B 5/0442 | |
| 2014/0033864 | A1 * | 2/2014 | Pieper | B04B 5/0442 | 74/665 A |
| 2014/0038760 | A1 * | 2/2014 | Manzella | B04B 5/0442 | 475/151 |
| 2014/0066282 | A1 * | 3/2014 | Manzella | B04B 5/0442 | 494/84 |

OTHER PUBLICATIONS

International Search Report and Written Opinion, counterpart International Appl. No. PCT/US2012/052472, date of mailing of the international search report Feb. 15, 2013.

International Preliminary Report on Patentability for corresponding International application No. PCT/US2012/052472, date of completion of the preliminary report Nov. 14, 2013.

* cited by examiner

DRIVE SYSTEM FOR CENTRIFUGE WITH PLANETARY GEAR AND FLEXIBLE SHAFT

CROSS-REFERENCE TO RELATED APPLICATION

This application claims the benefit of U.S. patent application Ser. No. 61/537,701 filed Sep. 22, 2011, which is hereby incorporated herein by reference.

FIELD OF THE DISCLOSURE

The present disclosure relates to a centrifugal processing system, and more particularly to a drive system for a centrifuge for blood cell separation and collection.

BACKGROUND

Continuous blood cell separation and collection is a well-known process for collecting desired blood components, such as red blood cells, platelets or plasma, from a donor. Typically, whole blood is withdrawn from a donor and directed into a centrifugal processing chamber to separate the whole blood into its various therapeutic components. This is usually carried out utilizing blood processing systems and methods comprising a durable centrifuge in association with a single-use, sterile fluid circuit including a processing chamber and associated storage containers, fluid flow tubing, and the like. The processing chamber is usually mounted in a centrifuge rotor or bowl, which spins the chamber, creating a centrifugal field that separates the whole blood into its components based on their density.

A well-known and exemplary centrifugal blood processing system is the Amicus Separator, available from Fenwal, Inc. of Lake Zurich, Ill. The functional aspects of the Amicus Separator are disclosed in, e.g., U.S. Pat. Nos. 6,312,607 and 6,582,349, the entire disclosures of which are incorporated herein by reference.

In a centrifugal processing system such as the Amicus, a centrifuge chamber assembly is rotatably mounted to a yoke, and a drive is provided such that the yoke is rotated at a first angular velocity (known as the "one Omega" velocity) and the bowl rotates at a second angular velocity that is twice the first angular velocity (known as the "two Omega" velocity). This relationship of the centrifuge chamber having an angular velocity twice that of the yoke ensures that the bundle of tubings leading to and from the processing chamber that forms a part of the single-use fluid processing circuit (commonly called the "umbilicus") is not twisted by the rotation of the centrifuge.

In one centrifugal processing systems of the prior art, a first electric motor spins the yoke assembly at one Omega, while a second electric motor mounted to the yoke spins the centrifuge chamber assembly at the same speed of rotation, in the same direction, and about the same axis as the first electric motor spins the yoke assembly. As a result, when viewed from a stationary or non-rotating position, the centrifuge chamber spins at twice the rotational speed of the yoke assembly, thus providing for the one Omega-two Omega relationship between the yoke and centrifuge chamber. Such a drive system is described in U.S. Pat. No. 5,360,542, which is incorporated herein by reference.

By way of the present disclosure, an improved drive system for a centrifuge system is provided that utilizes a single motor to rotate both the yoke and the centrifuge chamber assembly.

SUMMARY

The present subject matter has a number of aspects which may be used in various combinations, and the disclosure herein of one or more specific embodiments is for the purposes of disclosure and description, and not limitation. This summary only highlights a few of the aspects of the subject matter, and additional aspects are disclosed in the accompanying drawings and the following detailed description.

By way of the present application, a drive assembly that may advantageously be used in a centrifugal processing system is provided that rotates a first structure (the yoke assembly) about a first axis and at a first angular velocity, and rotates a second structure (the chamber assembly) coaxially with the first structure at a second angular velocity. The drive assembly includes a drive motor for rotating the first structure at the first angular velocity and the second structure at the second angular velocity, the second structure being mounted to the first structure so as to be rotatable relative to the first structure about a common axis of rotation.

In keeping with a first aspect of the disclosure, a first "gear" is mounted to the chamber assembly so as to be rotatable therewith about the common axis of rotation for the yoke and chamber assembly. A second "gear" is rotatably mounted to the yoke assembly so as to orbit with the yoke about the first gear and to axially rotate with respect to the yoke, but not axially rotate relative to the first gear. As such, the second gear is a "planetary gear" that orbits about the first gear, which is a "sun gear." The first and second gears are operatively connected so that upon rotation of the first structure (the yoke assembly) by the drive motor, the second gear orbits about the first gear to rotate the second structure (the chamber assembly) relative to the first structure (the yoke assembly).

In a further aspect of the disclosure, the first or planetary gear is preferably mounted to a linkage or shaft that rotates in unison with the yoke about the common axis of rotation and is fixed to a stationary support that prevents the linkage or shaft from rotating about its axis.

In keeping with another aspect of the disclosure, the first and second gears may comprise pulleys that may be operatively connected to each other by a belt. The pulleys may have teeth and the belt may comprise a timing belt. Alternatively, the gears may have intermeshing teeth.

In a further aspect of the disclosure, the ratio of the planetary gear to the sun gear is such that for each revolution of the planetary gear about the sun gear (i.e., for each revolution of the yoke) the sun gear (and, consequently the chamber assembly) rotates two revolutions.

In keeping with another aspect of the disclosure, the yoke may comprise a pivoting arm to permit movement of the chamber assembly between a closed or operating position and an open position that facilitates access to the chamber assembly for attachment and removal of the single-use processing chamber.

DETAILED DESCRIPTION

A more detailed description of the drive system for a centrifugal processing system in accordance with the present disclosure is set forth below. It should be understood that the description below of a specific device is intended to be exemplary, and not exhaustive of all possible variations or applications. Thus, the scope of the disclosure is not intended to be limiting, and should be understood to encompass variations or embodiments that would occur to persons of ordinary skill.

Figure 1:
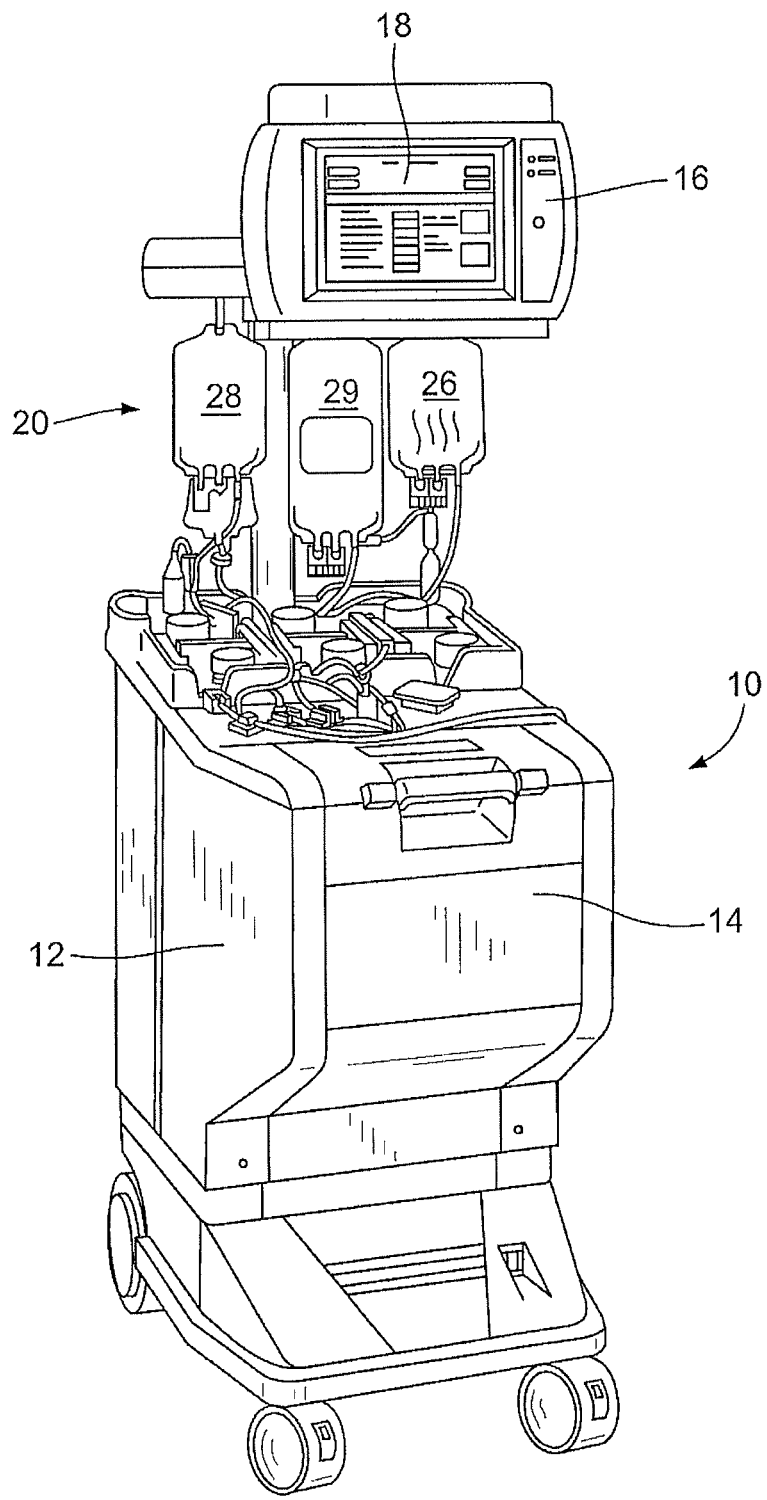
FIG. 1 is a perspective view of a centrifugal blood collection system that may utilize the drive system disclosed herein.

Turning to the drawings, there is seen in FIG. 1 a perspective view of a centrifugal blood separation system, generally designated 10. The system includes housing 12 for the centrifuge including a compartment 14 within which the centrifuge is mounted and which is slidable relative to the housing to provide access to the centrifuge. A micro-processor based controller or control system 16 is supported above the housing that includes a user interface in the form of a touch screen 18, through which data can be input and operation of the centrifuge system is controlled.

A single-use/disposable collection kit 20 is used in combination with the system. The collection kit is typically made of a flexible plastic material, and includes, among other components, a processing container or chamber (not shown) that is mounted to the centrifuge 14. A tubing bundle, or umbilicus, 22 (best seen in FIGS. 2 and 3) connects the processing chamber to the donor, for withdrawing whole blood from the donor for introduction into the processing chamber/container and returning selected blood components to the donor. Additional tubings connect prefilled solution bags for saline (bag 24) and anticoagulant (bag 26) that are suspended above the centrifuge housing, as well as a collection bag 28 for receiving the blood component that has been separated in the centrifuge from the whole blood.

Figure 2:
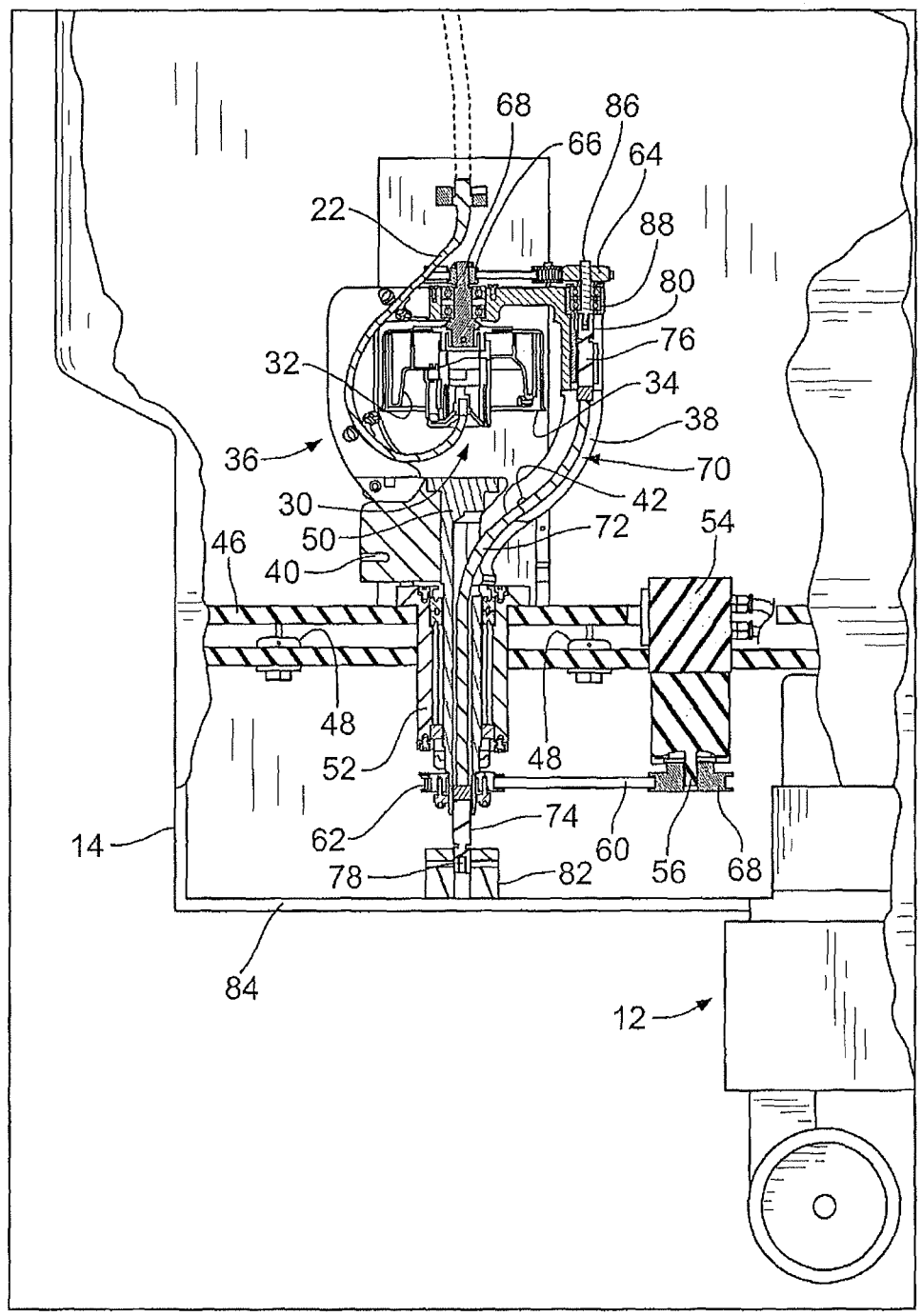
FIG. 2 is a side elevational view, with portions broken away to show detail a preferred embodiment of the separation chamber and its drive system of the centrifuge system of FIG. 1, with the yoke in its closed or operating position.
Figure 3:
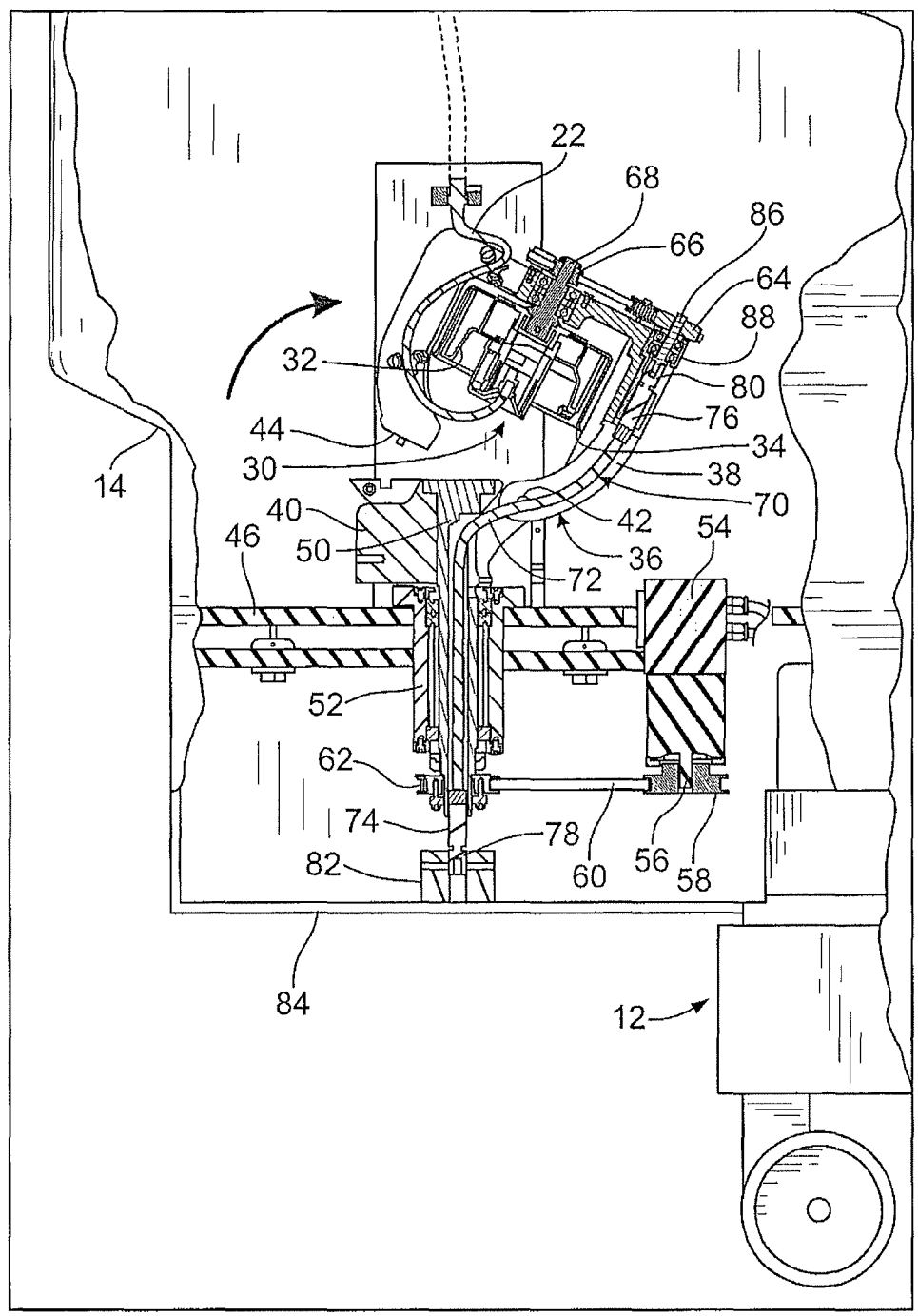
FIG. 3 is a side-elevational view similar to FIG. 2 with the yoke in its open position for facilitating loading and removal of a single-use processing chamber.

Turning to FIGS. 2 and 3, the centrifuge system 10 includes a centrifuge chamber assembly, generally designated 30, comprising a spool 32 onto which the processing chamber is loaded or mounted. The spool 32 is removably inserted into a bowl element 34 with the processing chamber wrapped about the spool. In operation, the spool 32 and bowl 34 are rotated in unison about a common axis. More specifically, the chamber assembly is mounted to a yoke assembly or frame, generally designated 36, so as to be movable between a first, open position (FIG. 3) to facilitate loading and removal of the spool/processing chamber to the bowl 34, and a second, generally inverted closed position (FIG. 2), in which the processing chamber is enclosed between the spool 32 and the bowl 34 for operation of the centrifuge system.

In the illustrated embodiment, the yoke assembly includes an arm 38 generally in the shape of an inverted "U" to which the chamber assembly 30 is attached. The U-shaped arm 38 preferably is pivotally secured to a base member 40 that is mounted to the yoke assembly drive system, which is described in greater detail below. The U-shaped arm 38 of the yoke assembly 36 is pivotable about a hinge pin 42 between an open position (as seen in FIG. 3) to permit access to the processing chamber, and a closed position (as seen in FIG. 2), with the free end 44 of the U-shaped arm 38 being connected to the base member with a latch mechanism for operation of the centrifuge.

In keeping with one aspect of the present disclosure, a drive assembly is provided for rotating a first structure (i.e., the yoke assembly) about its axis at a first angular velocity and simultaneously rotating a second structure (i.e., the centrifuge chamber assembly) coaxially with the first structure at a second angular velocity.

To rotate the yoke assembly 36 at the first angular velocity (at one Omega), the yoke assembly 36 is secured to a mounting plate 46 that is secured within the cabinet 14 of the centrifuge on vibration absorbing mounts 48. More specifically, the yoke assembly 36 is secured to a drive shaft 50 that is rotatably supported in a journal box/platform 52 that is preferably secured to the mounting plate 46. A drive motor 54 is also preferably secured to the mounting plate 46, with the drive shaft 56 of the drive motor 54 having a pulley 58 associated therewith that is connected by a belt 60 to a pulley 62 secured to the drive shaft 62 for the yoke assembly 36 to impart the one Omega angular velocity to the yoke assembly 36. Other means for rotating the yoke assembly drive shaft 50 may be provided, such as a direct drive between the yoke assembly drive shaft and the drive motor drive shaft.

In keeping with the disclosure, the centrifuge chamber assembly 30 is rotated relative to the yoke assembly 36 by means of a planetary gear 64 carried by the yoke 36 and a sun gear 66 that is secured to the drive shaft 68 for the centrifuge chamber assembly 30 coaxially with the yoke assembly 36. The planetary gear 64 and sun gear 66 are operatively connected so that upon the orbiting of the planetary gear 64 about the sun gear 66, the sun gear 66 and the centrifuge chamber assembly 30 are simultaneously rotated relative to the yoke assembly. While the term "gear" is used, it is not intended to limit the understanding of a "geared structure" to a toothed wheel structure, or the like. Instead, it is intended to broadly cover all structures that would occur to a person skilled in the art that operatively connect a drive structure and a driven structure to one another to impart rotation from one to the other. As such, "gear" is intended to cover structures with intermeshing teeth, as well as pulleys and wheels (toothed or smooth) in combination with belts and chains or the like.

In keeping with this aspect of the disclosure, the planetary gear 64 is mounted to the upper end of a flexible shaft 70 that is secured to the U-shaped arm 38 of the yoke assembly 36 so that, upon rotation of the yoke assembly 36, the shaft 70 orbits about the axis of rotation of the yoke assembly 36 simultaneously with the yoke assembly. The shaft 70 is also mounted to prevent the ends of the shaft from rotating about their longitudinal axes. To this end, the shaft 70 comprises a flexible intermediate portion 72 having sleeves 74, 76 at its ends that terminate in rotatable ends or barrels 78, 80. In the illustrated embodiment, the barrel 78 at the lower end of the flexible shaft 70 is anchored to "ground," (in this case, a support 82 on the floor 84 of the centrifuge cabinet 14) while the upper end is secured to the yoke assembly 36. The intermediate portion 72 is received in a passageway that extends through the yoke assembly 36 partially coincident with the axis of rotation of the drive shaft 50 at the lower end of the shaft 70 and through a portion of the U-shaped arm 38 at the upper end of the shaft. The intermediate portion 72 of the shaft 70 preferably comprises a flexible, yet torsionally stiff material (e.g., wound steel wire), but may comprise other materials having the requisite strength, flexibility and fatigue-resistance characteristics.

The barrel 80 at the upper end of the flexible shaft 70 carries an axle 86 to which the planetary gear 64 is mounted. The axle 86 is mounted in a bearing assembly 88 that permits rotation of the planetary gear 64/axle 86/upper barrel 80 as the yoke assembly 36 rotates about its axis so that the orientation of the planetary gear 64 relative to the sun gear 66 remains constant as the planetary gear 64 orbits about the sun gear 66. As best understood with reference to FIG. 4, the planetary gear 64 is mounted to its axle 86 by a key way 90. The key way 90 points "north," (labeled "N" in FIG. 4) and continues to point "north" throughout the orbit of the planetary gear 64 about the sun gear 66.

Figure 4:
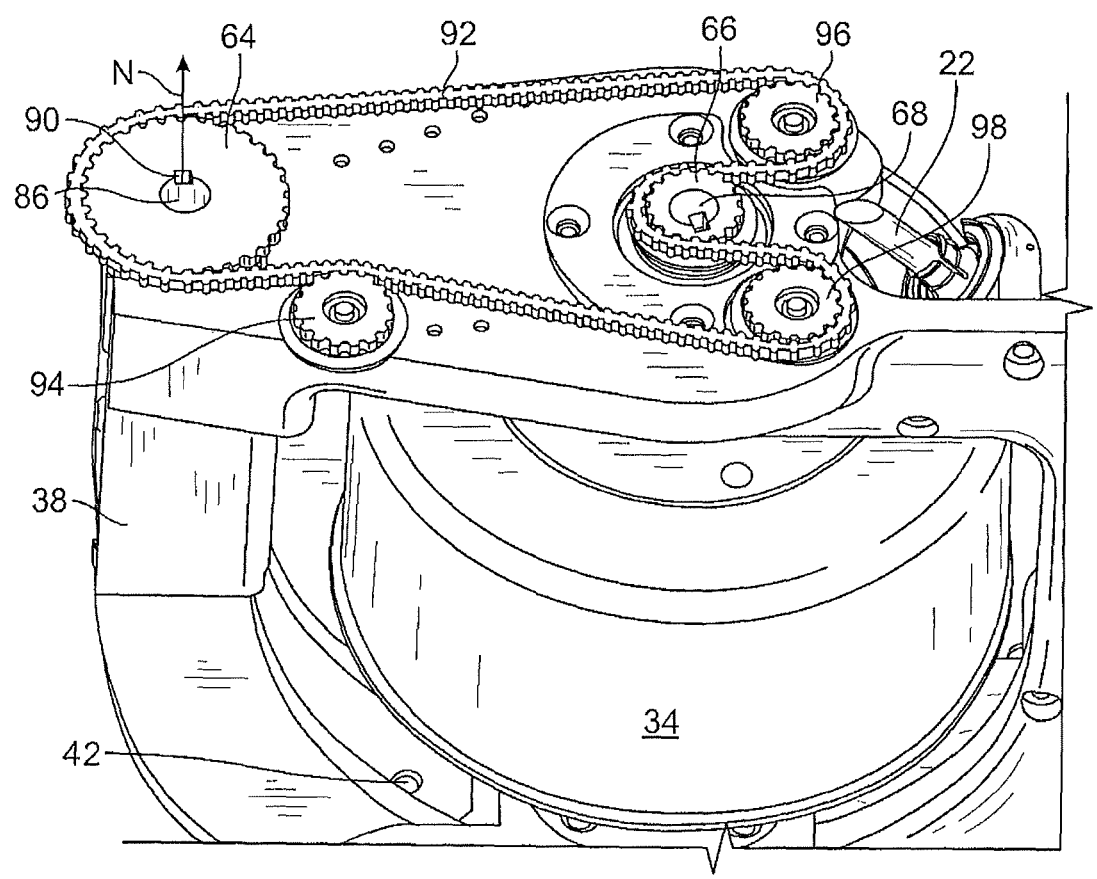
FIG. 4 is an enlarged perspective view showing the relationship between the planetary and sun gears of the drive system.

As noted above, the planetary gear 64 is operatively connected to the sun gear 66 so as to impart rotation to the sun gear 66 and centrifuge chamber assembly 30 upon rotation of the yoke assembly 36. As best seen in FIG. 4, the planetary gear 64 and sun gear 66 comprise sprockets that are operatively connected by a toothed or timing belt 92 to synchronize the movement of the planetary gear 69 and the sun gear 66. A first idler gear 94 properly tensions the timing belt 92, while idler gears 96 and 98 are used to reverse the direction of the timing belt 92 relative to the sun gear 66 so that the chamber assembly 30 is rotated in the same direction as the yoke assembly 36. The ratio of the planetary gear 64 to the sun gear 60 is selected to insure that for each rotation of the yoke assembly 36 about its axis (and, consequently, each orbit of the planetary gear 64 about the sun gear 66) the chamber assembly 30 rotates twice, thus providing the one-omega-two-omega relationship of the angular velocity of the yoke assembly 36 to the chamber assembly 30. While sprockets and timing belts are shown in FIG. 4, the planetary gear 69 and sun gear 66 may have directly intermeshing teeth without departing from the scope of the disclosure.

Thus, an improved drive system for a centrifuge has been disclosed. The description provided above is intended for illustrative purposes only, and is not intended to limit the scope of the invention to any particular embodiment described herein. As would be obvious to those skilled in the art, changes and modifications may be made without departing from a disclosure in its broader aspects. Thus, the scope is to be as set forth in the following claims.

The invention claimed is:

1. A drive mechanism for rotating a first structure at a first angular velocity and rotating a second structure at a second angular velocity about a common axis of rotation comprising:
    a drive motor for rotating the first structure;
    the second structure mounted to the first structure so as to be rotatable relative to the first structure about the common axis of rotation;
    a sun gear fixed to the second structure for rotation therewith about the common axis;
    a planetary gear rotatably mounted to the first structure so as to orbit with the first structure about the common axis and axially rotate relative to the first structure, but to not axially rotate with respect to the sun gear, the planetary gear being operatively connected to the sun gear to rotate the second structure upon rotation of the first structure by the drive motor;
    a stationary support; and
    a flexible shaft fixed on a first end to the stationary support movable in unison with the first structure about the common axis of rotation and having the planetary gear mounted to a second end thereof.

2. The drive mechanism of claim 1 in which the planetary gear and the sun gear have intermeshing teeth for operatively connecting one to the other.

3. The drive mechanism of claim 1 wherein the planetary gear and the sun gear comprise pulleys.

4. The drive mechanism of claim 3 further comprising a belt operatively connecting the pulleys.

5. The drive mechanism of claim 4 wherein the pulleys have teeth and the belt comprises a timing belt.

6. The drive mechanism of claim 1 in which the ratio of the planetary gear to the sun gear is such that for each revolution of the planetary gear about the sun gear the second structure rotates two revolutions.

7. A centrifuge system having a drive mechanism in accordance with claim 1 in which the first structure is a yoke and the second structure is a chamber assembly, the yoke comprising a pivotable arm to which the second structure is mounted, the arm being movable between an open position and a closed, operating position.

\* \* \* \* \*